United States Patent Office 2,787,628
Patented Apr. 2, 1957

2,787,628

REACTION OF CARBON MONOXIDE WITH HYDROGEN TO FORM ALCOHOLS

Wilhelm Himmler, Ludwigshafen (Rhine), and Georg Schiller, Mannheim, Germany, assignors to Badische Anilin- & Soda-Fabrik Aktiengesellschaft, Ludwigshafen (Rhine), Rhineland-Pfalz, German Federal Republic No Drawing. Application February 6, 1952,
Serial No. 270,275

Claims priority, application Germany March 13, 1951

4 Claims. (Cl. 260—449)

This invention relates to a process for the production of alcohols by the reaction of carbon monoxide and hydrogen.

It is known that by heating carbon monoxide with hydrogen under pressure in the presence of certain catalysts it is converted into methyl alcohol. It has also been found that in the reaction between carbon monoxide and hydrogen there are formed, besides methyl alcohol, higher alcohols, in particular isobutyl alcohol if alkali be added to the catalysts used for the methanol synthesis and the speed of flow of the gases is kept lower than in the formation of methyl alcohol. A liquid product can thus be obtained which contains from about 10 to 15% of isobutyl alcohol.

We have now found that the yield of isobutyl alcohol can be considerably increased by using as catalysts oxides of the metals of the 4th accessory group of the periodic system which contain 0.5 to 10% of alkali, and so regulating the volumetric speed of the gases to be reacted at reaction temperatures of 300° to 500° C. and under pressures of more than 50 atmospheres that 1000 to 10,000 volumes of gas are supplied per volume of catalyst per hour.

By working in this way liquid products are obtained which contain 20 to 40% of isobutyl alcohol and otherwise consist substantially of methyl alcohol and higher alcohols. Only a slight amount of water is formed by the process.

It has already been proposed in the reaction of carbon monoxide with hydrogen to use as catalysts, instead of the previously employed metal oxides or in addition to the said oxides, oxides of titanium or of adjacent elements of group 4 of the periodic system. By the said process methyl alcohol is obtained almost exclusively, it not having been realized that by the simultaneous addition of certain small amounts of alkali and by using a rate of flow of the gases which is smaller than that used in the methanol synthesis, considerable amounts of butyl alcohol can be recovered. Hydrocarbons, in particular methane, are formed only in very small amounts.

Among the metals of the 4th group of the periodic system of which the oxides are to be used according to this invention, zirconium and titanium are especially suitable. Other activating oxides of trivalent metals may be added thereto, as for example oxides of indium, gallium, aluminium or trivalent chromium. Zirconium oxide together with indium oxide and potassium oxide has proved especially suitable. Other alkalies, as for example rubidium oxide, may be used instead of potassium oxide.

The catalysts are preferably prepared from the aqueous solutions of salts of metals of the 4th group of the periodic system by precipitation with alkalies, as for example potassium hydroxide, potassium carbonate or ammonia. The temperature of precipitation may be raised up to the boiling point of the solution. As a rule, temperatures of 50° to 70° C. are used, however. The precipitate is filtered off by suction, washed out with distilled water and dried at 90° to 110° C. If it does not contain sufficient alkali, this may be added for example by allowing the dry catalyst to absorb the alkali deficiency from a solution or by evaporating an alkali solution into which the catalyst has been introduced. In many cases it is advantageous to heat the catalyst in the presence of oxygen or hydrogen before use. The catalysts may also be employed on carriers, as for example alumina.

The reaction of carbon monoxide and hydrogen takes place at temperatures of 300° to 500°, advantageously of 400° to 460° C., and at pressures of more than 50 atmospheres. The volumetric speed at which the gases flow through the reaction chamber is, as already mentioned, about 1000 to 10,000 volumes of gas per volume of catalyst per hour (calculated to normal conditions). Within the said ranges, the temperature and volumetric speed are mutually adjusted in such a way that as the temperature rises so does the volumetric speed. It has been found that by working in this way especially good yields of isobutyl alcohol are formed. The gases leaving the reaction chamber may be returned thereto in a cycle.

The following examples will further illustrate this invention but the invention is not restricted to these examples.

Example 1

A solution of 250 grams of zirconium nitrate and 13 grams of indium nitrate in 2.5 liters of water and 2 N caustic soda solution are allowed to flow into 1 liter of water at 60° C. while stirring vigorously. The pH-value is kept at 8 to 9. The precipitate is filtered by suction, washed free from nitrates and dried at 100 to 110° C.

A catalyst is obtained the bulk density of which is about 1.1 grams per cubic centimeter and which contains a small amount of alkali (1.1% $K_2O$). 300 liters per hour of a gas consisting of 40% carbon monoxide, 55% hydrogen and 5% nitrogen is led over 40 cubic centimeters of the said catalyst in a copper-lined reaction tube about 1 meter in length. The temperature is 435° C., the pressure 250 atmospheres and the volumetric speed, as can be calculated from the above figures, is 7500 liters of gas per liter of catalyst per hour.

8.1 liters of liquid product containing 51% of methyl alcohol, 25% of isobutyl alcohol and 10.5% of alcohols of higher boiling point are obtained per liter of catalyst per day. The remainder consists of other oxygen-containing organic compounds and water.

Example 2

Titanium dioxide hydrate is precipitated at 60° C. from a solution of 350 grams of potassium titanium oxalate in 3 liters of water by means of 2 N potassium hydroxide solution. The precipitate is filtered off by suction, washed and dried at 100° to 110° C.

The dried catalyst has a bulk density of 0.7 to 0.8 gram per cubic centimeter and has an alkali content of 5.6% $K_2O$. 150 liters per hour of a gas consisting of 45% of carbon monoxide, 50% of hydrogen and 5% of nitrogen is led over 40 cubic centimeters of this catalyst. The temperature is 400° C. and the pressure 250 atmospheres.

There are obtained daily for each liter of catalyst 5 liters of liquid product containing 60% of methanol and 20% of isobutyl alcohol in addition to water, higher alcohols and other oxygen-containing organic compounds.

What we claim is:

1. In a process for the production of isobutyl alcohol by reaction of carbon monoxide and hydrogen at a temperature of about 400° to 460° C. and at a pressure above about 50 atmospheres, the improvement which comprises carrying out the reaction in the presence of a catalyst containing a preponderance of an oxide of a metal selected from the group consisting of zirconium and titanium, an oxide of a metal selected from the group consisting of indium, gallium, aluminum and trivalent chromium, and about 0.5 to 10% of alkali, and passing about 1000 to 10000 volumes of gas per hour per volume of said catalyst over the catalyst.

2. The process as claimed in claim 1 wherein zirconium oxide together with indium oxide and potassium oxide is used as the catalyst.

3. The process as claimed in claim 1 wherein the temperature and volumetric speed of the gases are so correlated that at higher temperature the speed of the gas is also higher.

4. In a process for the production of isobutyl alcohol by reaction of carbon monoxide and hydrogen at a temperature of about 400° to 460° C. and at a pressure above about 50 atmospheres, the improvement which comprises carrying out the reaction in the presence of a catalyst consisting essentially of a preponderance of an oxide of a metal selected from the group consisting of zirconium and titanium, an oxide of a metal selected from the group consisting of indium, gallium, aluminum and trivalent chromium, and about 0.5 to 10% of alkali, and passing about 1000 to 10000 volumes of gas per hour per volume of said catalyst over the catalyst.

References Cited in the file of this patent
UNITED STATES PATENTS

| | | |
|---|---|---|
| 1,562,480 | Wietzel et al. | Nov. 24, 1925 |
| 1,889,251 | Krauch et al. | Nov. 29, 1932 |
| 1,900,829 | Lusby | Mar. 7, 1933 |
| 2,301,687 | Dorschner | Nov. 10, 1942 |

FOREIGN PATENTS

| | | |
|---|---|---|
| 229,714 | Great Britain | Feb. 23, 1925 |
| 229,715 | Great Britain | Feb. 23, 1925 |

OTHER REFERENCES

"Brennstoff-Chemie" (Pichler et al.), Band 30–31, pages 13–22 (1949).

Storch et al.: "The Fischer-Tropsch and Related Synthesis," pages 106 to 110; publishers John Wiley and Sons, Inc., New York, Chapman and Hall, Ltd., London (1951).